United States Patent Office 3,469,802
Patented Sept. 30, 1969

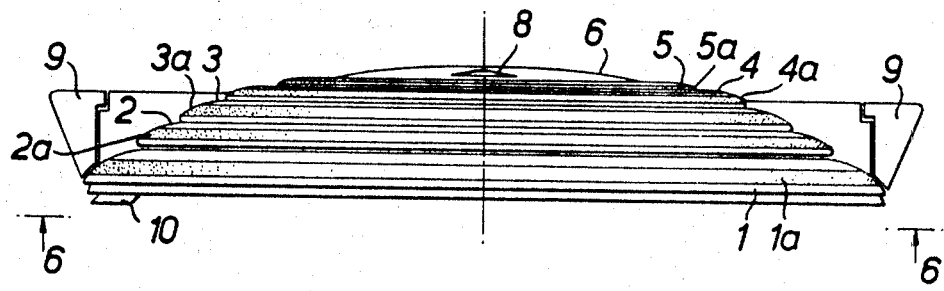
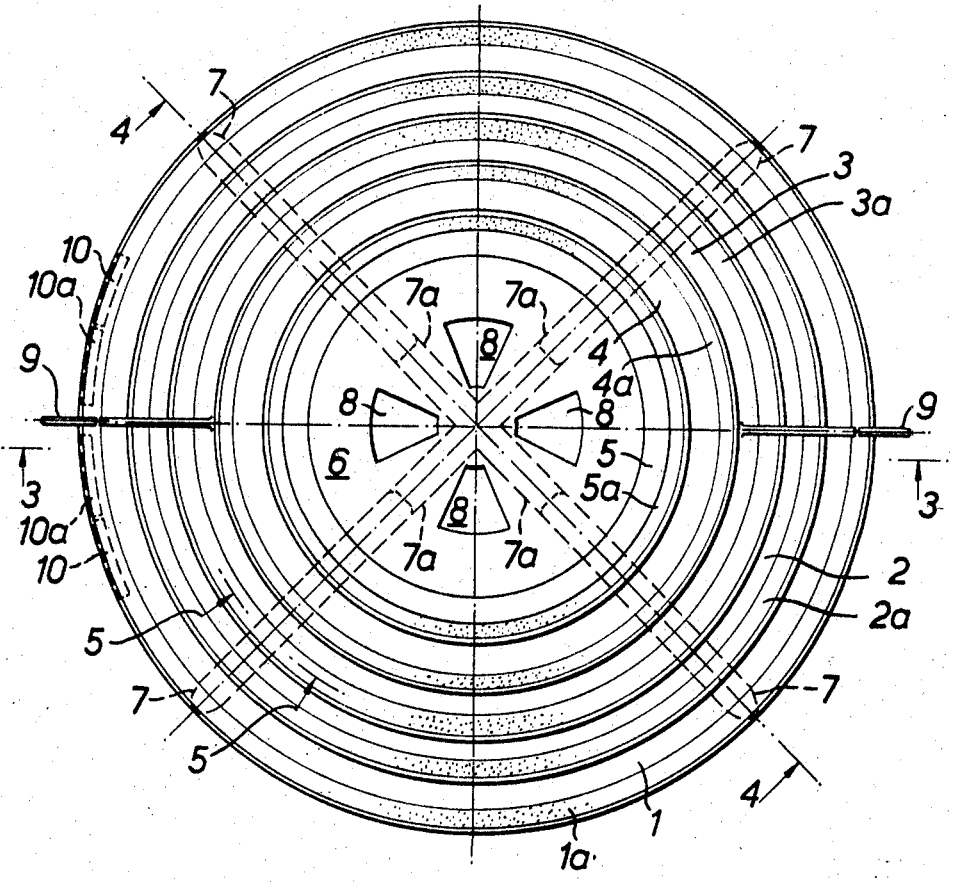

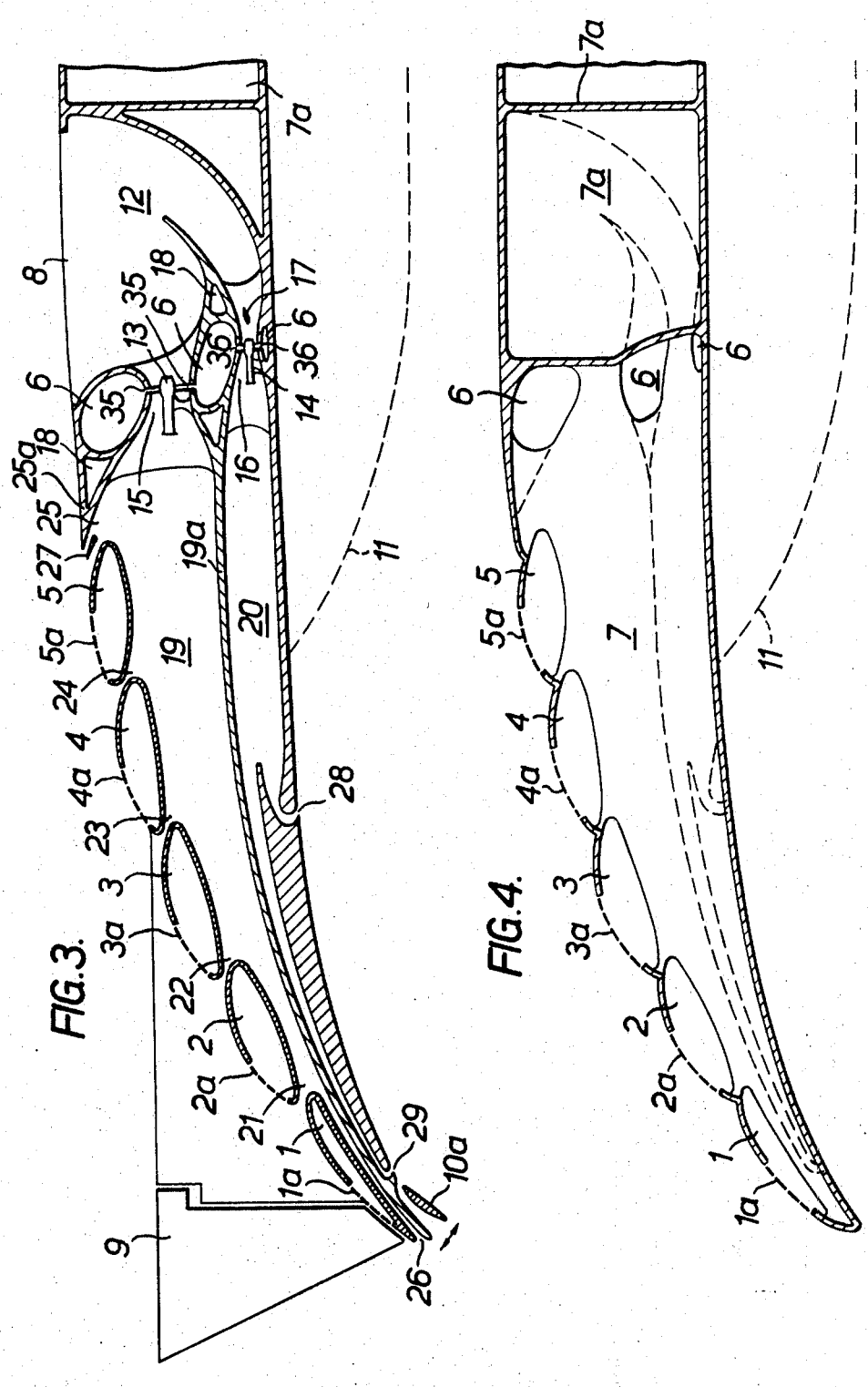

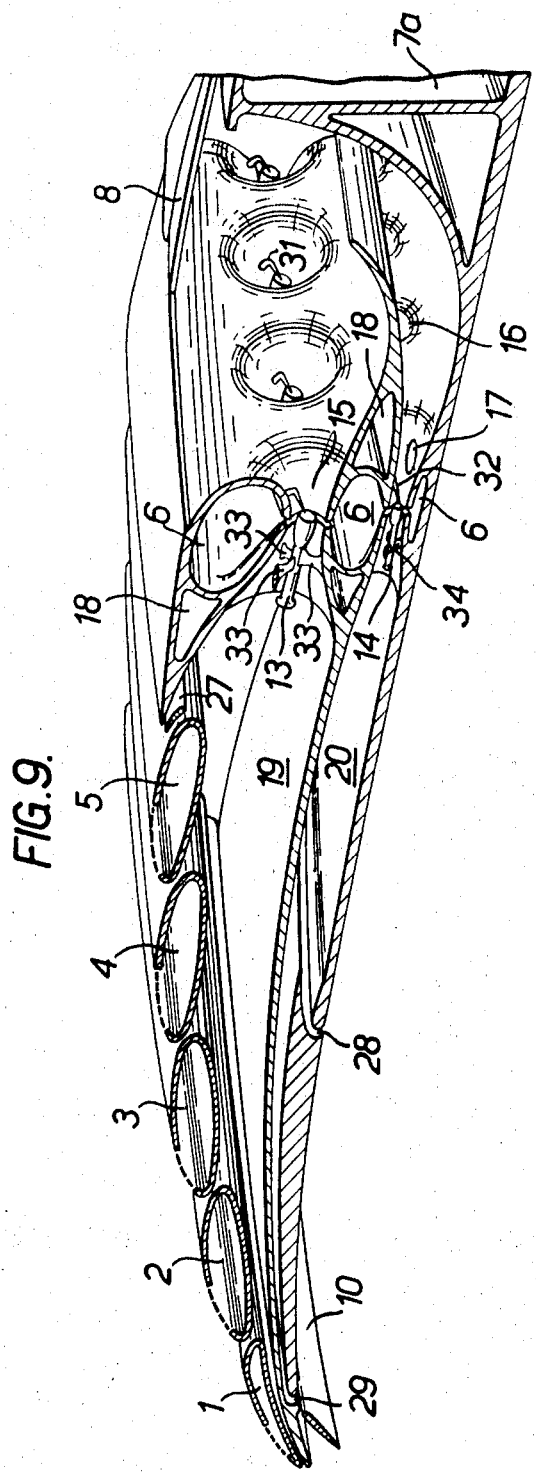

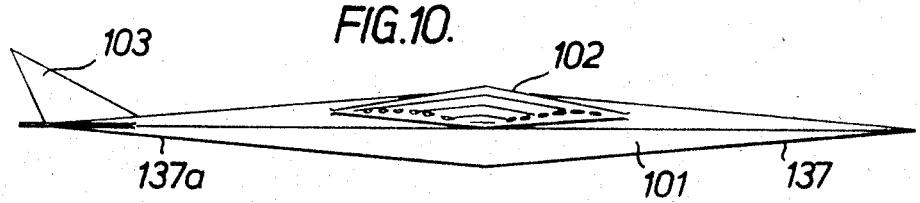
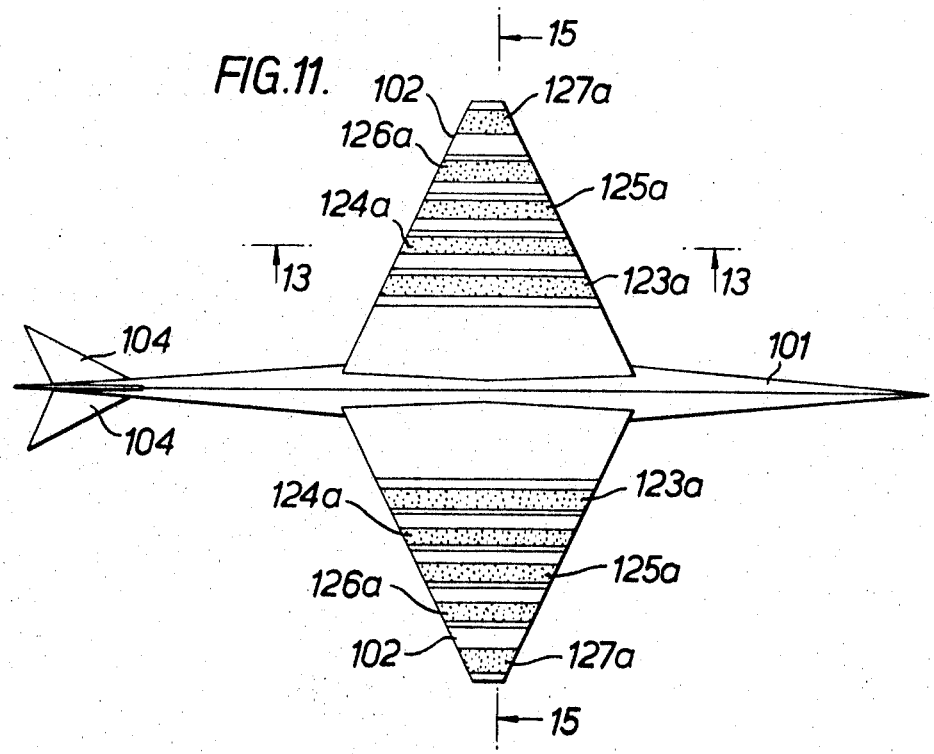
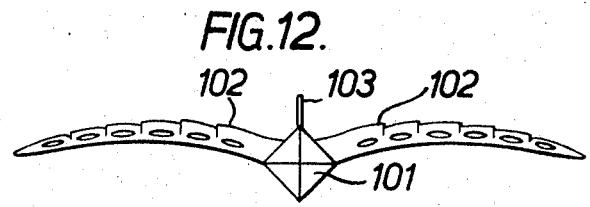

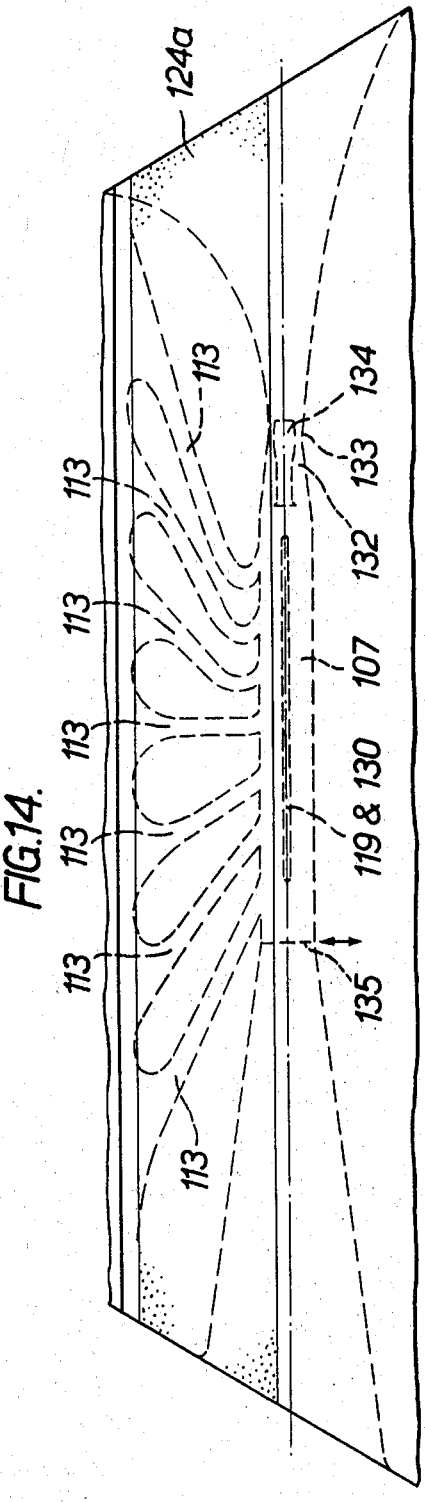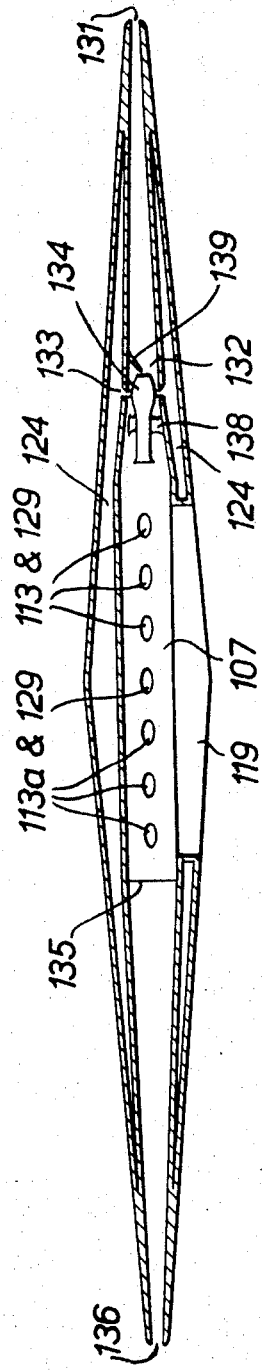

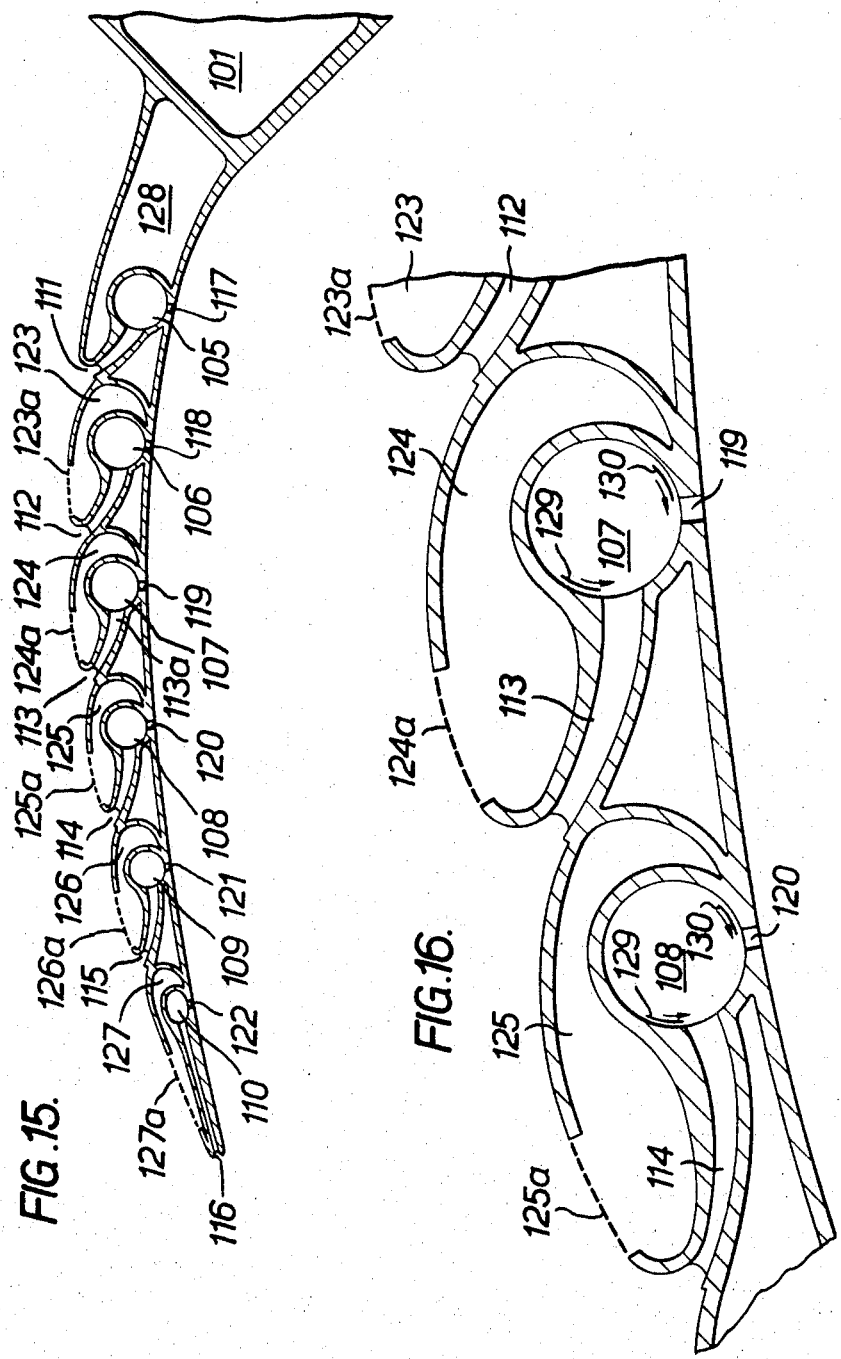

3,469,802
TRANSPORT
John R. Roberts, 634 Ferguson St., Palmerston North,
North Island, New Zealand, and Michael J. Alexander,
21 Brassey Road, Wanganui, North Island, New Zealand
Filed Mar. 7, 1966, Ser. No. 534,569
Claims priority, application New Zealand, Mar. 31, 1965,
141,194
Int. Cl. B64c 15/00, 29/04
U.S. Cl. 244—12                                    10 Claims

ABSTRACT OF THE DISCLOSURE

An aircraft in which a body is provided with lifting surfaces and flow creating means within the body is adapted to produce a flow of air or gases relative to which lift of the body may be realized. Furthermore, means are provided for producing a reduced pressure between the flow of air or gases and the lifting surfaces so that vertical flight of the body results when such flow exists and the reduced pressure is operative between the flow and the lifting surface.

Figure 5:
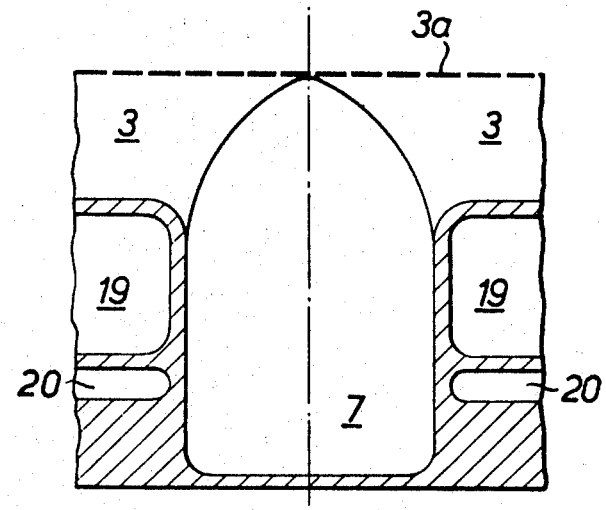

This invention relates to transport.

At present, a considerable amount of work is being devoted to V.T.O.L. and S.T.O.L. aircraft by the use of downwardly directed thrusts of air in which a sufficient volume of air is displaced downwardly to provide a direct lift for the aircraft even though there is no forward motion to cause lift on the wing surfaces. This technique has disadvantages in that tremendous amounts of power are required, with the thrusts of the jets necessarily exceeding the total weight of the aircraft giving excessive thrusts for sub-sonic horizontal flights.

It is therefore an object of the present invention to provide transport means and methods of operating the same which will obviate or minimize the foregoing disadvantages or which will at least provide the public with a useful choice.

Accordingly, in one aspect, the invention is directed to a method of transport which will impart vertical lift to an aircraft, comprising the steps of providing from within an aircraft having lift surfaces, a body of air of gases directed to move appropriately in relation to the lifting surfaces of the aircraft providing such a reduction in pressure between such body of air or gases and said lifting surfaces as to result in the aircraft being supported thereby.

In a further aspect, the invention is directed to a method of lifting a body having lifting surfaces, comprising the steps of causing a flow of air to pass from within the body relative to said lifting surfaces in a manner such that reduced pressures result between at least some parts of said flow of air and said lifting surfaces, so that the body is lifted relative to the flow of air, with such lifting causing the flow of air per se to be lifted relative to the earth's surface resulting in free flight in a vertical direction.

In a still further aspect, the invention is directed to an aircraft comprising a body adapted to carry personnel and/or materials, lifting surfaces associated with said body, flow creating means within said body adapted to produce a flow of a body of air or gases relative to which lift of the body may be effected and means to produce a reduced pressure as between said flow of air or gases and said lift surfaces in a such manner that vertical flight of said body takes place when said flow of air gases exists and said reduced pressure is operative between said flow of air or gases and said lifting surfaces.

In an alternative construction, the airfoils are arranged as approximately rectangular surfaces with the longitudinal axis thereof arranged parallel to a fuselage of the aircraft but provided with an airfoil section along the longitudinal axis thereof so that for vertical flight said body of air is caused to flow transversely of the fuselage and consequently transversely across said airfoil sections with forward motion being arranged by progressively diverting some air flow from the transeverse direction to the longitudinal direction and rearwardly so that an aircraft will rise vertically and then be translated to forward motion when a suitable height and attitude have been achieved.

In a still further aspect, the invention is related to an aircraft comprising a body having lifting surfaces and means within the aircraft to cause a flow of air to travel relative to said lifting surfaces in such a manner that a reduced pressure results between parts of said flow of air and said lifting surfaces whereby free flight of said body in a vertical direction results without the necessity for forward flight.

Figure 6:
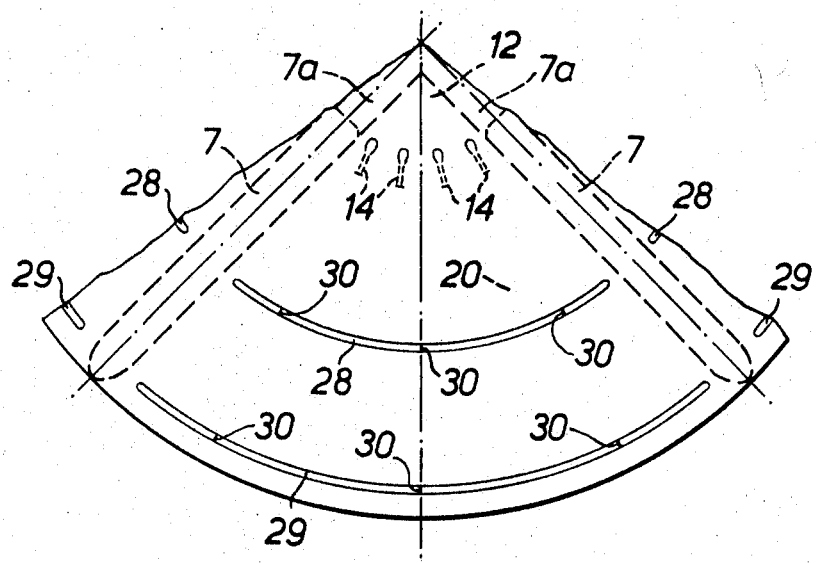
Figure 7:
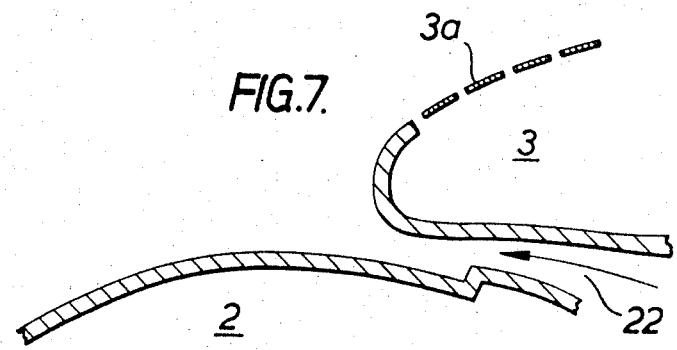
Figure 8:
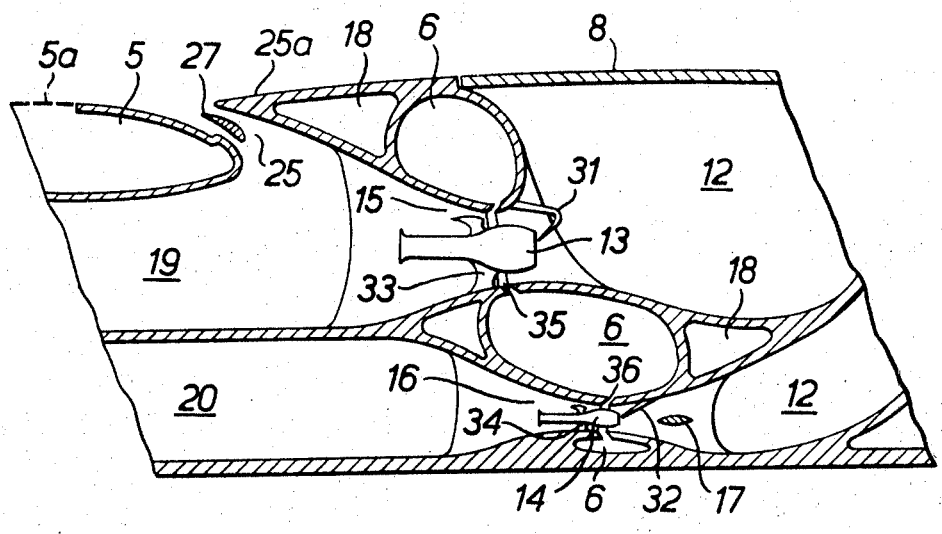

Further important objects and advantages of the invention will become more rtadily apparent to persons skilled in the art from the following detailed description and annexed drawings and in which drawings:

FIGURE 1 is a view in side elevation of one form of aircraft according to the present invention, FIGURE 2 is a plan view of FIGURE 1, FIGURE 3 is a view in half section taken along the line 3—3 of FIGURE 2, the view looking in the direction of the arrows, FIGURE 4 is a view in half section taken along the line 4—4 of FIGURE 2, FIGURE 5 is a view in part section taken along the line 5—5 of FIGURE 2, the view looking in the direction of the arrows, FIGURE 6 is a quarter inverted plan view of the aircraft shown in FIGURE 2, FIGURE 7 is an enlarged detailed view of a part of FIGURE 3 showing part of the annular airfoil sections and a primary plenum outlet slot therebetween, FIGURE 8 is a further enlarged detailed view of part of FIGURE 3 showing an annular return duct, primary and secondary engines, and their respective venturis, FIGURE 9 is a view in perspective have section of the aircraft shown in the preceding figures, FIGURE 10 is a view in side elevation of a further alternative form of the invention, FIGURE 11 is a plan view of the aircraft shown in FIGURE 10

Figure 17:
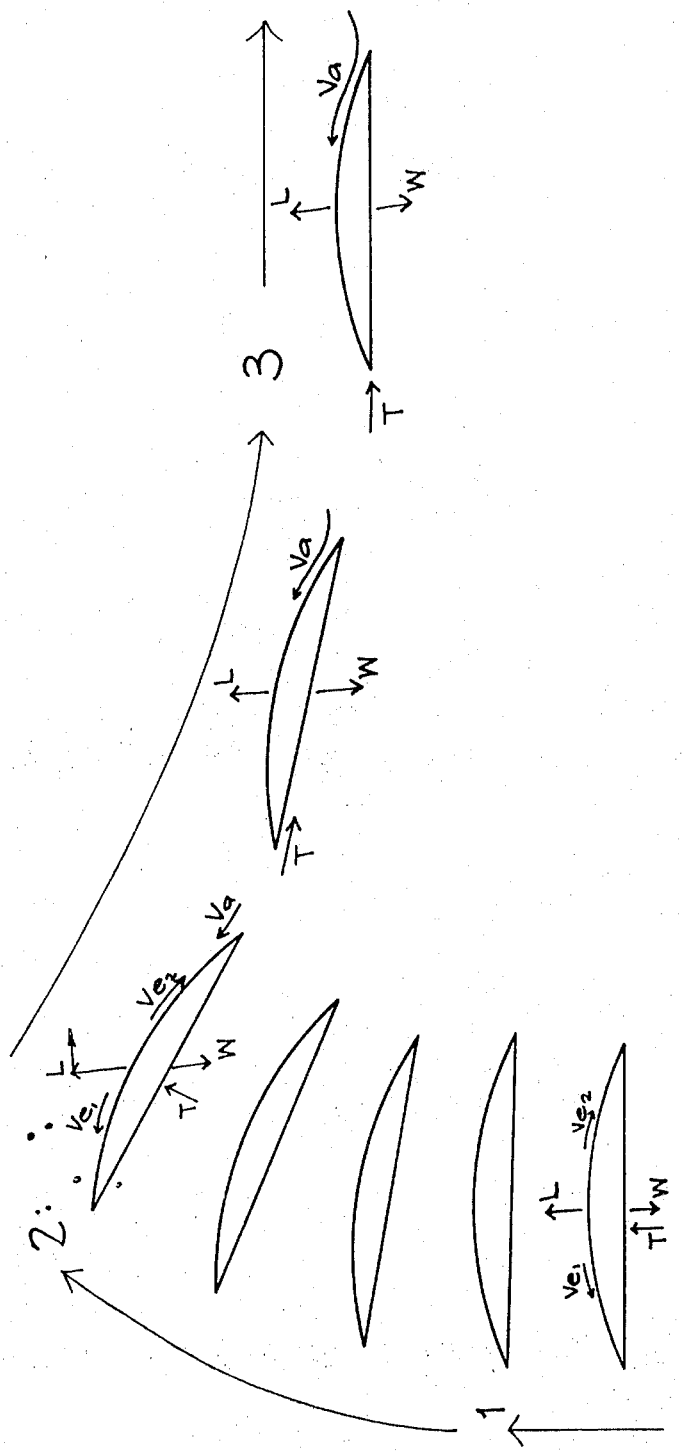

FIGURE 12 is a view in front elevation of the aircraft shown in FIGURES 10 and 11, FIGURE 13 is a view in cross section taken along the line 13—13 of FIGURE 11, the view looking in the direction of the arrows, FIGURE 14 is a part plan view of the port wing of the aircraft shown in FIGURE 11, FIGURE 15 is a view in section taken along the line 15—15 of FIGURE 11, the view looking in the direction of the arrows, FIGURE 16 is an enlraged detailed view of part of FIGURE 15, and FIGURE 17 is a diagrammatic view.

In the preferred form of the invention, an aircraft is provided with a body having lifting surfaces as will be seen from FIGURES 1-4. The aircraft in the preferred form is circular in outline and consequently surrounding the body or fuselage are a plurality of annular lifting surfaces 1–5 comprising a series of airfoil sections arranged with the leading edge of the second section adjacent to the trailing edge of the first, the leading edge of the third adjacent to the trailing edge of the second and so on. At least four to six such annuli are provided and for a larger aircraft more would be provided. The shape of the airfoil section will be referred to later. Small, i.e. narrow in width spaces channels 21–24 are provided between the trailing edge of one annulus and the leading edge of the next annulus. These may be continuous or discontinuous but preferably are as continuous as possible having regard to structural requirements.

Each airfoil section forward of the trailing edge thereof is perforated over part of the surface as indicated at 1a, 2a, 3a, 4a and 5a thereof for a short distance, preferably over a distance somewhat less than half of the exposed upper surface of the airfoil section. At least a part of the interior of each annular lifting surface is hollow as shown. The annuli are otherwise airtight except for the perforated portions on the upper surface thereof. The hollow interiors of the annuli are connected by radial ducts 7 as illustrated in FIGURES 2 and 5 where the annulus 3 is in communication with the duct 7. The ducts 7 are provided as radial structural members 7a so that they serve the dual purpose of supporting the airfoil sections and forming the ducts communicating the interiors of the annuli with annular return ducts 6. The hollow interiors of the airfoil sections are connected by ducts 7 to the three sets of return ducts 6 (FIGURES 3 and 4).

As shown particularly in FIGURES 3 and 4, the airfoil sections may overlap slightly with the undersurface of the trailing edge of, for example, the airfoil section as disclosed in the trailing annulus. The overlapping surfaces provide walls or orifices 21–24 which provide primary plenum outlet slots between adjacent airfoil sections and such orifices connect the exterior of the lifting surfaces with a chamber 19 defined by the undersurfaces of the annuli and a further membrane 19a which separates the two plenum chambers and a further plenum chamber 20 to be later described. The ducts 7 and structural members 7a divide the plenum chambers 19 and 20 into four parts. Referring to FIGURE 5, there is clearly shown the functions of the radial return duct 7 both in connecting the annular return duct 6 to the interior of the airfoil sections, such as the airfoil 3 (FIGURE 5), and also in separating the primary plenum chamber 19 into four individual plenum chambers 20 divided into four separate secondary plenum chambers. In addition, there is shown the perforated portion of the surface of the airfoil section 3.

It can be seen in FIGURE 3 that each succeeding annulus is disposed slightly lower than the preceding annulus as shown in the drawings so that there is a drooping upper surface to the lifting surfaces which will be hereinafter discussed.

The chamber is supplied with means within the body for providing a source of a flow of air and/or gases, and this source preferably comprises a plurality of pulse jet engines 13, with each engine being arranged in a primary venturi 15 (FIGURES 3 and 9). The precise number and power rating of such pulse engines 13 would of course depend on the size of the aircraft and the pulse jets may or may not be augmented, for example by the ram jet principle or otherwise.

However, other types of power sources will be useful, for example turbo-jet engines alone or turbo-jets driving turbo-fans, with such engines or fans discharging into the chamber 19.

Since it is desired to pass a considerable volume of air over the lifting surfaces the flow from the sources of power, for example the pulse jet engines 13 within the venturi 15 in a manner such that the combustion gases induce a flow of air through the venturi (between the walls of the venturi 15 and the outer surface of the engine 13) so that the combined flow of gases and air is considerably augmented compared with the flow of combustion gases of the pulse jet engine alone.

The flow of gases from the pulse jet engines and the flow of air induced to flow through the venturi by the action of the jet engines are led to the chamber 19. Connection means comprising primary venturi apertures 35 are provided adjacent the throat of the venturi 15 and lead into the upper and center return ducts 6 to cause a reduction in pressure in the system to which such ducts 6 are connected (the radial ducts 7 and the hollow interiors of the airfoil sections 1–5). This reduction in pressure causes air to be drawn from adjacent the upper surfaces of the outermost parts of the individual airfoil sections of the annuli through the perforated surfaces 1a, 2a, 3a, 4a and 5a, with this air being then discharged into the main flow of air caused by the venturi action.

The flow of gases from the engines 13 and the air passing through the venturis 15 cause a build-up pressure in the chamber 19. This pressure causes an outflow of gases through the primary plenum outlet slots 21, 22, 23 and 24 and in addition, a further slot 25 is provided between the leading edge of airfoil section 5 and a shaped member 25a forming part of the fuselage adjacent a fuel tank 18 which conforms to the shape of the leading edge of the airfoil section 5 so as to provide this slot 25. Furthermore, a Handley Page type of slot 27 is provided to assist in controlling the flow of air as is apparent from FIGURE 8. The flow of air passing through the slot 25 is the initial flow of air which passes outwardly and downwardly over the airfoil sections 5, 4, 3, 2 and 1 in that order, with the flow of air being supplemented by the additional flows through slots 24, 23, 22 and 21. Adjacent the outer edge of the outer airfoil section 1, there is a further slot 26 which serves to smooth the flow of air as it passes outwardly and downwardly over the trailing edge of the airfoil section 1. It will be appreciated that the flow of air and gases over the airfoil sections is modified because of the inflow of air and gases through the openings 1a to 5a but this will be described hereinafter in more detail.

It is to be noted that the primary venturi 15 and the pulse jet engines 13 are provided on the wall of an air intake chamber 12 (FIGURE 3), and the air intake chamber 12 is provided with air intakes 8 which each have controllable shutters.

As above mentioned, a secondary plenum chamber 20 is provided and this chamber is pressurized in substantially the same manner as that of the chamber 19, namely, by the provision of pulse jet engines 14 mounted in venturis 16, with the venturis having secondary venturi apertures 36 connecting the venturis to the annular return ducts 6 as shown. The air intake to the pulse jet engines and the venturis is from the air intake chamber 12 but in this case a pluraltiy of butterfly valves 17 control the supply of air to the pulse jet engines. The valves 17 are grouped in four groups, with each of the four groups operating over an arc of 90° so that by closing one of the four groups the part of the plenum chamber 20 associated with that group has its pressure reduced compared with that in the remaining three chambers 20. The plenum chamber 20 is per se, divided into four compartments by the hollow ducts as mentioned above, and the structural members 7a intersecting the plenum chamber 20 to this end. Leading from each section of the plenum chamber 20 is a secondary plenum outlet slot 28 and further secondary plenum outlet slot 29. These slots are substantially ring-shaped as shown in FIGURE 6. These slots are segments of rings and are formed in cross section as disclosed in FIGURE 3 to direct jets of air and gases downwardly and inwardly. The purpose of these jets is firstly to provide a certain amount of lift and secondly to permit their control for the purpose of controlling the attitude of the aircraft. It will be understood that if the butterfly valve leading to one quarter of the plenum chamber 20 is closed, then the jet issuing from the secondary plenum outlet slots 28 and 29 in the other three quarters will now exert an unbalanced force tending to drive the aircraft in a direction other than directly vertical. This will be referred to later in describing the flight pattern of the aircraft. It is to be understood that the lift of the aircraft results from the fact that there is normal atmospheric pressure below the aircraft augmented by a flow of air and gases through the slots 28 and 29, and on the upper surface because there is reduced pressure, so that the pressure on the lower surface must produce an upward force. In addition, there is a kinetic reaction resulting from the downward flow of gases from the slots 28 and 29. Manually controllable pivotable deflectors 30 are provided transverse to the length of the slots 28 and 29 to enable any tendency of the aircraft to spin on its vertical axis to be controlled. The flow of the air and gases from the slots may be controlled in other ways, such as for example, by varying the sizes of these orifices, by blocking the same, or varying the direction of flow of air and/or gases therefrom so that dimensional stability can be maintained.

In addition to the foregoing which are concerned with control of the aircraft during vertical flight conditions only, i.e. when there is little or no horizontal component of flight, control surfaces are provided to control the aircraft during forward flight. Such control surfaces may comprise rudders 9 for directional stability (FIGURES 2 and 3), elevators 10a (FIGURE 2) for pitch control and 10 for the normal control of roll or lateral stability. These controls will be manually controllable in a known manner as applied to conventional aircraft.

So that the aircraft can be self-sustaining in horizontal flight in the manner in which a conventional aircraft is self-sustaining, the airfoil sections 1 to 5 are formed so that they droop towards the outer edge and overall contour is arranged whereby upon looking at the aircraft as a whole, for example, the sections in FIGURE 3 or 4, and when the aircraft is moving in the direction of the arrow shown in FIGURE 1, the contours of the airfoil sections are combined so that an overall lifting surface results which will cause lift when the aircraft is moving through the air horizontally at a sufficient speed.

As mentioned earlier, the fuel tanks 18 are provided in the fuselage and there are connected by suitable connections, such as pipes 31 to supply fuel to the pulse jet engines 13 and by pipes 32 to the jet engines so that these latter will operate in the known way. Primary engine mountings 33 and secondary engine mountings 34 are provided as shown.

A load pack or seating compartment 11 is provided in a suitable disposition in relation to the aircraft, for example underneath the lower surface thereof, as shown in FIGURES 3 and 4. The load pack or seating compartment can be fixed or detachable as desired.

The flying of the above discussed aircraft is as follows:

The pulse jet engines 13 and 14 are activated and as a result a flow of gases draws air through the venturis 15 and 16 surrounding the engine and this mixture of air and gases enters the chambers 19 and 20, respectively. In addition, the air passing through the venturis causes air to be drawn out via passageways 35 and 36 from the annular return ducts 6 and thus out of the radial ducts 7 and hence from the hollow interiors of the airfoil sections 1–5 and this of course, causes a reduction in pressure over the perforated portions 1a–5a of the airfoil sections.

The air and gases passing into the chamber 19 cause a flow of air and gases through the slot 25 which is directed outwardly and to some extent downwardly by the shape of the surface of the airfoil section 5 and by the slat 27. This air then passes over the airfoil section 5 with some of the air being withdrawn through the perforated section 5a and then the remaining air leaps up with a further supply of air and gases passing through slot 24. The shape and the relative arrangement of the airfoil sections are such that the sections are at an angle of incidence to the airflow such that a lift is induced by reducing the pressure relative to the surface of the annuli. It is believed that this annular incidence between the air flow from the slots 21 to 24 and the general line of airflow over the surfaces of the airfoil sections is a much greater angle of incidence than is met with in normal practice and has the advantage that it allows a high lift to be obtained with a low velocity of air or gas.

The air flowing from each succeeding jet meets air flowing from an earlier jet, except, of course, the first jet coming from the slot 25. Thus, there is a deflection of the the combined flow of air and gases which it is believed tends to follow the surfaces of the airfoil and this tendency is increased by the removal from the rear part of each airfoil section of air adjacent that portion of the surface through the perforated portions 1a to 5a which air flows into the hollow interiors of the airfoils through the radial duct 7 and the annular return duct 6, the passagways 25 and 26 back into the air flow through the venturi 15. Hence, a reduction of pressure may be obtained above the lifting surfaces partly due to the flow of air and gases moving outwardly over the lifting surfaces and partly due to the induction of air flow through the perforated portions 1a to 5a with the latter assisting laminar flow.

The flow of air in general follows the surface of the airfoil sections which in cross section is arranged to be undulating but drooping towards the outer edge as above referred to. A series of hills thus appears being the centers of the airfoil sections and a series of hollows appear at the junctions between adjacent airfoil sections, i.e. where the new flows or jets of air and gases are admitted. The air and gas flow, because of the secondarily directed air through succeeding slots and because of the reduced pressure at the rear of the airfoil sections tends to follow this undulating surface, but is separated therefrom by a short distance in which the reduced pressure operates.

It is to be noted that the secondarily directed air and gases do not result from forward motion of the airfoil sections through the air but from the pressure in the chamber 19 forcing this flow of air and gases outwardly through the slots 21 to 25.

The secondary plenum chamber 20 is, of course, also pressurized by operation of the pulse jet engines 14 and by the flow of air through the venturi 16. The pressurized air and gases are discharged through the orifices 28 and 29. The flow from these orifices is directed downwardly but also inwardly as can be seen from the shape of the slots in FIGURE 3. The effect of the outflow of air and gases from these slots is three-fold. Firstly, there is a kinetic effect which gives some lift due to the reaction from the gas flow. Secondly, there is a build-up of pressure below the aircraft due to the downward and inward flow of the gas streams which augments the atmospheric pressure existing below the aircraft. Thirdly, the stability of the aircraft is controllable by the pilot operating either butterfly valves 17 for each of the four quarters into which the slots 28 and 29 are divided or alternatively or in addition the pilot may control the pivoted deflector 30 to control spinning of the aircraft. In controlling the aircraft, for example viewing FIGURE 2, should the aircraft drop on any "side" which has reference to any of the four quadrants separated by the radial ducts 7, then the pilot will reduce the pressure to the chamber 20 on the high side of the aircraft. Since the pilot has control of four chambers he has control of the stability of the aircraft.

As a result of a reduction in pressure on the upper surfaces of the aircraft and of the increase of pressure on the lower surfaces due to the downwardly directing jets both by the kinetic and pressure effects, lift of the aircraft is obtained. As a particular result thereof, the body of the air flowing over the upper surfaces of the aircraft is in turn lifted because the slots 21 to 25 per se, are being lifted so that as the slot is being lifted, the jet of air emerging from the slots is lifted. Consequently, there is an upward movement of this body of air even though the flow of air from the jets is downward relative to the surfaces of the airfoil sections. However, the whole of the aircraft is being lifted as above stated. It is to be noted that during vertical lift, the conventional aircraft control surfaces 9, 10 and 10a are not used. It is, however, now required that the aircraft start to move in a horizontal direction. To cause forward movement of the aircraft, the pilot controls the butterfly valve 17 leading to the forward quadrant of the chamber 20 to reduce the pressure in that chamber and as a result, the forward portion of the aircraft will drop. The slots 28 and 29 in the three remaining quadrants will, however, exert a thrust which will be substantially along the vertical axis of the aircraft as previously although the line of thrust may be somewhat forward of the vertical, but in any event, the net result is that the thrust has a horizontal component which is directed forwardly, thus tending to start to move the aircraft in a forward direction. Hence, the lift component moves to the rear while the weight component moves forward effecting a forward component of force tending to tilt the aircraft in a forward direction. In addition, because of the reduction of lift due to the reduction in pressure in the forward quadrant, the aircraft will tend to move downwardly as well as forwardly. This is controlled by the pilot to a stage where there is an increase in forward air speed. At an appropriate time, the pilot either operates shutters 8 on the air intake to the three forward quadrants of the chamber 19 and deactivates the engines of these quadrants thus stopping the flow of air over three forward quadrants, and leaving only the rearmost quadrant operating. The pilot simultaneously shuts off the lower jets 28 and 29 to all quadrants. The foregoing imparts thrust from the rear quadrant causing a rapid increase in horizontal velocity sufficient to sustain a forward flight by virtue of the movement of the air over the lifting surfaces operating as an airfoil as a whole. At this stage, the orthodox rudder, elevator and aileron control system is brought into operation and the aircraft is now flying in the same manner as an orthodox aircraft with the vertical flight system being inoperative, except that thrust is obtained from the rear quadrant by the discharge of gases over the airfoil surfaces of this quadrant.

To land, the following procedure is employed:

The machine enters a climb attitude and power is applied to all of the engines thus causing a loss of horizontal velocity and therefore a loss of normal airfoil lift. However, this is replaced by vertical lift due to the flow of air and gases over the airfoil surfaces, then the whole of the lift is provided by the engines causing air to flow from within the aircraft over the airfoil surfaces. The pilot now controls the attitude of the aircraft using the controls which operate the slots 28 and 29, and when the aircraft is in its horizontal disposition, the pilot then reduces power supplying air and gases to the chambers 19 so that the aircraft starts to sink or descend. The pilot comes in contact with the ground when he can deactivate the engines. Of course, the rate of sink is controllable by increasing or decreasing the power to the engines supplying the chambers 19. In the above horizontal flight, power is obtained by using the flow of air and gases over the rearward part of the rearward quadrant of the aircraft. Horizontal flight can also be achieved by separate thrust sources incorporated in the aircraft.

In relation to the construction, it should be stated that generally the gaps between the rings should increase towards the outer edge.

The above described construction is of particular value for subsonic travel. For supersonic travel or flight, certain variations would, of course, be necessary, not from the viewpoint of obtaining vertical lift but to permit the aircraft to also obtain supersonic speeds in forward flight. Thus, in FIGURES 10 to 16 there is illustrated diagrammatically an aircraft designed for accomplishing such end.

There is no difference in operating principle between the aircrafts of FIGURES 1 to 9 and FIGURES 10 to 14 in relation to the vertical lift aspect of both aircraft. In the aircraft of FIGURES 1 to 9, the airflow is from the center of the aircraft outwardly over annular rings. In the embodiment shown in FIGURES 10–14 in order to provide vertical lift, there is a flow over each wing from the fuselage outwardly towards the wing tips. Thus, referring to FIGURES 10 and 11, an aircraft of more orthodox appearance than the circular aircraft above described is illustrated and includes a fuselage 101, a wing 102, rudder 103, and a tail plane 104. As in the previously described aircraft, the lift surfaces are provided as airfoils over which air and gases may be directed from within the aircraft for vertical lift and this flow is along the length of the wings and over which air may pass when the aircraft is moving in a forward direction for normal horizontal flight and this flow is transverse to the length of the wings, i.e. in orthodox flow. On FIGURE 12 it will be seen that the wings 102 are curved or drooped to a similar configuration as the cross section of the circular aircraft lifting surfaces. With reference to FIGURE 15, there is illustrated a series of airfoil sections 123, 124, 125, 126 and 127 arranged with the trailing edge of one adjacent the leading edge of the next with a slot 112, 113, 114 and 115 between adjacent leading and trailing edges. As was the case of slot 26, a slot 116 is provided to pull air and gases off smoothly during vertical flight. Associated with each of the slots 112–115 is a plenum chamber 102, 107, 108, 109 and 110, and an additional plenum chamber 105 supplies air and gases to slot 111. In FIGURES 13 and 14 it will be seen that the plenum chamber 107 is provided with a pulse jet engine 134 mounted on a mounting 38 and having a fuel pipe 139 located in a venturi 132. The venturi is connected by a venturi aperture 133 with the hollow interior of an airfoil 123 leading to a perforated section (of which 123a, 125a, 126a and 127a are counterparts in the remaining airfoils) of the airfoil 124a in a similar manner to that in which the venturi 15 of the circular aircraft leads to the perforated sections, e.g., 4a, of the airfoils. The jet engines 134 and the venturi 132 discharge air and gases into the plenum chamber 107 where a primary lift plenum outlet valve 129 controls the flow of air and gases from the plenum chamber 107 to the slot 113 and thus the control of air and gases to slot 113. Additionally, the plenum chamber 107 supplies air to a secondary lift plenum outlet 119 which is controlled by a valve 130 (FIGURES 15 and 16). The secondary lift plenum outlets 117, 118, 119, 120, 121 and 122 correspond to the previously described secondary lift outlets 28 and 29. In FIGURE 14, a thrust control valve 135 is provided and beyond such thrust control valve there is an outlet 136 leading to the trailing edge of the wing. It is to be understood that the wing as shown in FIGURE 13, has an airfoil section and more particularly is a triangular shaped airfoil having an inlet 131 for admitting air to the pulse jet engine 134 which is especially suitable for supersonic flight.

To provide fore and aft trim, fore and aft twin jets 137 and 137a are shown in FIGURE 10, and ducts lead from a plenum chamber to the jets, for example the chamber 105 being in communication with jets 137 and 137a. These jets are controllable to provide longitudinal stability, and are provided on the undersurface of the fuselage. Fuel tanks are illustrated at 128.

The operation of the supersonic aircraft is substantially similar to the operation of the circular aircraft. In beginning flight, the engines 134 are started but the controls are operated in the following manner:

The thrust control 135 is positioned to prevent the egress of air and gases rearwardly through the thrust outlet 136, in other words, the valve is closed so that the chamber 107 and so on are under pressure. In addition, the plenum primary outlet valves 129 are opened as shown in FIGURE 16. As a result, air and gases under pressure from the chambers 107 and 110 may pass though the slots 111 to 115. In addition, the plenum secondary outlet valve is also opened so that air and gases may pass through the secondary lift plenum outlets 119 and 112. There are now flows of air and gases substantially similar to the flows of air and gases in the circular aircraft. Thus, there is a flow of air and gases from the slot 111 which passes outwardly along the line of the wings toward the wing tips thereof. This flow of air and gases passes firstly over the airfoil 123 is then augmented by a further flow of air and gases over the airfoil 124 and so on towards the wing tip. This corresponds to the flow of gases described in connection with the circular aircraft. Moreover, there is a downward flow from the secondary lift plenum outlets 117 and 112 which are controllable by the valves 130 to give control of stability of the aircraft in a lateral direction and of course, the pliot will also control the jets 137 and 137a for longitudinal stability of the aircraft. Due to the flow of air outwardly along the length of the wings towards the wing tips, there will be vertical lift as previously described in connection with the circular aircraft.

Again, when the aircraft reaches a suitable altitude, a transfer to horizontal flight will be necessary. In this connection, the aircraft is caused to assume a nose down attitude by control of the jets 137 and 137a and valves 135 are then partially opened to give some forward thrust which results from the egress of air and gases from plenum chambers 107 and so on rearwardly beyond the valves 135 through the thrust outlet 136. Progressively, the valves 130 and 119 to 122 are closed while the valve is progressively opened. In this way, there is a build-up of horizontal speed and a lessening of the vertical lift effects due to the flow of air along the length of the wings with this flow of air being replaced by a flow of air over the upper surface of the wings in a direction transverse to the length of the wings, i.e. in normal air flow. Until there is forward motion, the ordinary conventional controls of the aircraft are not in use and conversely after horizontal flight has been achieved, the control of the jets 137 and 137a to give control of longitudinal stability are not used.

It will be apparent that there is a similar principle of operation between the circular and the supersonic aircraft, though in detail there is a variation in the application of power. During supersonic flight, it will be understood that air enters the continuous aperture 131 in the wings of the aircraft, flows through or around the jet engines 134 and passes rearwardly through the chambers 105 to 110 and out at the rear of the wing through the apertures 136 to give a constant forward thrust to the aircraft.

Referring to FIGURE 17 and more particularly to the question of take-offs, namely, the position from rest to the zone 1 which may be termed the vertical take-off phase, the primary and secondary engines are controlled to be on uniform power for providing engine rest and vertical velocity as hereinabove described. With respect to the zone between 1 and 2, that is the tilt phase, differential power is applied to the front and rear quadrant secondary engines for causing the aircraft to tilt forwardly thereby imparting some horizontal velocity to the aircraft due to the thrust vector which now has a horizontal component associated therewith. The guard phase, that is to say, zones 2–3, has the primary engine stopped from the front and both side quadrants thereby bringing about a loss of engine lift and consequently a loss of altitude. This results in increase in forward air speed by reason of the tilted attitude of the aircraft augmented by the thrust from the rear quadrant effecting a rapid increase in horizontal velocity until the position 3 is attained, when the air speed over the lifting surfaces as an entity is sufficiently high to reflect lift due to the normal airfoil action of the lifting surfaces as a whole.

From the position or zone 3 forward, the horizontal flight phase is illustrated and after the position 3 has been attained, forward thrust is effected on the primary engines in the rear quadrant to afford sufficient horizontal velocity to maintain such flight controlled by the orthodox or conventional elevator, aileron and rudder assemblages.

With respect to landing, the procedure is reversed so that in phases or zones 3–2 (the stall phase), the aircraft enters a climb position and power is applied to all of the engines thereby causing a loss of horizontal velocity and as a consequence, the loss of normal airfoil lift. Such airfoil lift is replaced by the lift as above described which effects vertical lift.

Turning now to phases or zones 3–1 (let-down phase), at position 2 the normal airfoil lift due to the forward velocity is zero and the whole of the lift is effected by the engine creating the vertical lift previously described. The secondary engines are operated with differential power on the front and rear quadrants, thus causing the aircraft to assume a horizontal attitude and a further loss of horizontal velocity assuming, as a matter of fact, that there is any horizontal velocity left.

As to phase or zone 1, namely, the landing phase, uniform power is applied to both primary and secondary engines with the later being controlled to effect stability of the aircraft. The power is decreased to give a satisfactory descent rate and immediately prior to landing the power may be increased somewhat for reducing the vertical rate of descent. This is, of course, under the control of the pilot and as a consequence, the precise degree of engine power applied will depend on the rate of descent required or necessary. Ideally, of course, the rate of descent when touching the ground level will be zero or close thereto.

What we claim is:

1. An aircraft comprising a body, means within said body providing a source of flow of gases, lifting surfaces on said body defined by a plurality of airfoil sections, said airfoil sections being disposed with the leading edge of the second section adjacent to the trailing edge of the first section and the leading edge of the third section adjacent the trailing edge of the second section, with said first, second and third sections being relative to the flow of gases over the airfoil sections, means defining at least one chamber positioned relative to said airfoil sections, outlet means to deliver a flow of gases from said source of flow through said chamber over said airfoil sections, with positioning of said outlet means and the shape of said airfoil sections being such that the resultant flow of gases relative to said lifting surfaces produce a reduced pressure on said lifting surfaces whereby vertical flight takes place when the gases flow, perforated areas in trailing portions of the upper surfaces of each of the airfoil sections communicating with the hollow interiors of the airfoil sections, pressure reducing means for creating an air flow of reduced pressure, and duct means connecting the pressure reducing means to the hollow interiors of the airfoil sections and thus the perforated areas for drawing air from the upper surfaces of the trailing portions.

2. An aircraft comprising a body, lifting surfaces on said body, means on said aircraft providing a source of flow of gases, outlet means to deliver a flow of gases from said source over said lifting surfaces, said lifting surfaces comprising a plurality of airfoil sections disposed with the leading edge of the second section adjacent the trailing edge of the first section and the leading edge of the third section, said first, second and third airfoil sections being positioned relative to the flow of gases over the airfoil sections, means defining at least one chamber positioned relative to said airfoil sections, the positioning of said outlet means and the shape of said airfoil sections being such that the resultant flow of gases relative to said lifting surfaces produces a reduced pressure therebetween so that vertical flight takes place when the gases flow, perforated areas in trailing portions of the upper surfaces of each of the airfoil sections communicating with the hollow interiors of the airfoil sections, pressure reducing means for creating an air flow of reduced pressure, and duct means connecting the pressure reducing means to the hollow interiors of the airfoil sections and thus the perforated areas for drawing air from the upper surfaces of the trailing portions.

3. An aircraft comprising a body, lifting surfaces on said body, means on said aircraft providing a source of flow of gases, outlet means to deliver a flow of gases from said source over said lifting surfaces, said outlet means being positioned to cause said flow of gases to pass in a manner such that some reduction in pressure is created between the flow of gases and the lifting surfaces by virtue of the relative angle of incidence between at least some parts of the lifting surfaces and the flow of gases, said lifting surfaces comprising a plurality of airfoil sections disposed with the leading edge of the second section adjacent the trailing edge of the first section and the leading edge of the third section adjacent to the trailing edge of the second section, said first, second and third sections being positioned relative to the flow of gases over the airfoil sections, means defining at least one chamber positioned relative to said airfoil sections, means on said aircraft to create a reduced pressure, duct means to provide communication between the surfaces of said airfoil sections adjacent the trailing edges thereof with said means to create a reduced pressure whereby some of the air adjacent the boundary of said lifting surfaces is removed continuously during operation to cause a reduction in pressure, and the positioning of said outlet means and said flow-directing means and the shape of said airfoils being such that the resultant flow of gases relative to said lifting surfaces produce a reduced pressure such that vertical flight takes place when the gases flow.

4. An aircraft comprising a body, lifting surfaces on said body, means on said aircraft providing a source of flow of gases, outlet means to deliver a flow of gases from said source over said lifting surfaces, said outlet means being positioned to cause said flow of gases to pass in a manner such that some reduction in pressure is created between the flow of gases and the lifting surfaces by virtue of the relative angle of incidence between at least some parts of the lifting surfaces and the flow of gases, said lifting surfaces comprising a plurality of airfoil sections disposed with the leading edge of the second section adjacent the trailing edge of the first section and the leading edge of the third section adjacent to the trailing edge of the second section, said first, second and third sections being positioned relative to the flow of gases over the airfoil sections, means defining at least one chamber positioned relative to said airfoil sections, means on said aircraft to create a reduced pressure, duct means to provide communication between the surfaces of said airfoil sections adjacent the trailing edges thereof with said means to create a reduced pressure whereby some of the air adjacent the boundary of said lifting surfaces is removed continuously during operation to cause a reduction in pressure, and the positioning of said outlet means and the shape of said airfoils being such that the resultant flow of gases relative to said lifting surfaces produce a reduced pressure such that vertical flight takes place when the gases flow, and said duct means also forming part of the frame of said aircraft.

5. An aircraft comprising a body, means within said body providing a source of flow of gases, lifting surfaces on said body defined by a plurality of airfoil sections, said airfoil sections being disposed with the leading edge of the second section adjacent to the trailing edge of the first section and the leading edge of the third section adjacent the trailing edge of the second section, with said first, second and third sections being relative to the flow of gases flowing over the airfoil sections, means defining at least one chamber positioned relative to said airfoil sections, outlet means to deliver a flow of gases from said source of flow through said chamber over said airfoil sections, with the positioning of said outlet means and the shape of said airfoil sections being such that the resultant flow of gases relative to said lifting surfaces produce a reduced pressure on said lifting surfaces whereby vertical flight takes place when the gases flow, and a series of said lifting surfaces being arranged side by side with the longitudinal axis lying parallel to the longitudinal axis of the aircraft and with the shape of each lifting surface having an airfoil shape both longitudinally and transversely.

6. The aircraft as claimed in claim 1, wherein said reduced pressure is achieved by means to cause the flow of air to pass through a venturi means so as to cause a reduction in pressure in a part thereof and so that the air drawn from adjacent the surface of said lifting surfaces is admixed with the gases discharged to provide said flow of air.

7. The aircraft as claimed in claim 1, wherein said aircraft has a central portion and said airfoil sections are formed as annuli around the central portion of said aircraft, with said annuli being positioned one beyond the other.

8. The aircraft as claimed in claim 1, wherein said aircraft has a central portion and said airfoil sections are formed as annuli arranged around said central portion of said aircraft, said annuli being arranged one beyond the other and in which the upper surface of said annuli looked on as a combination is provided as an airfoil surface whereby flow of air in a plane parallel to said upper surfaces causes lift when the aircraft as a whole is moved in horizontal flight.

9. The aircraft as claimed in claim 7, wherein means are provided to control the flow of air over parts of said annuli in a manner such that forward motion of the aircraft may be achieved by controlling such flow to give thrust caused by passing the air in one direction only relative to the center of said aircraft.

10. The aircraft as claimed in claim 1, wherein said means providing a source of a flow of air comprise propulsion means selected from pulse jet means without added ram effect, pulse jet means with added ram effect, turbo-jet engines driving turo-fans and turbo-jet engines alone and venturi means positioned in relation to the outlet means of said pulse jet means so that the flow of gases from said pulse jet means causes a flow of air to flow through said venturi means whereby the volume of gases moved by said pulse jet means is augmented as compared with the volume of gases which would be moved by said pulse jet means alone.

References Cited
UNITED STATES PATENTS

| | | | |
|---|---|---|---|
| 2,821,351 | 1/1958 | Utgoff | 244—42 X |
| 2,925,231 | 2/1960 | Pfaff et al. | 244—42 |
| 2,468,787 | 5/1949 | Sharpe | 244—12 |
| 2,547,266 | 4/1951 | Hoglin | 244—12 |
| 2,801,058 | 7/1957 | Lent | 244—12 |
| 3,237,888 | 3/1966 | Willis | 244—23 |
| 3,298,636 | 1/1967 | Arnholdt. | |

MILTON BUCHLER, Primary Examiner

THOMAS W. BUCKMAN, Assistant Examiner

U.S. Cl. X.R.

244—35, 41, 42, 45, 73